Jan. 7, 1936. H. J. DILLON 2,026,827

TRANSMISSION MECHANISM

Filed July 10, 1934 2 Sheets-Sheet 1

INVENTOR.
Hugh Joseph Dillon
BY
George B. Ingersoll
ATTORNEY.

Jan. 7, 1936.   H. J. DILLON   2,026,827
TRANSMISSION MECHANISM
Filed July 10, 1934   2 Sheets-Sheet 2
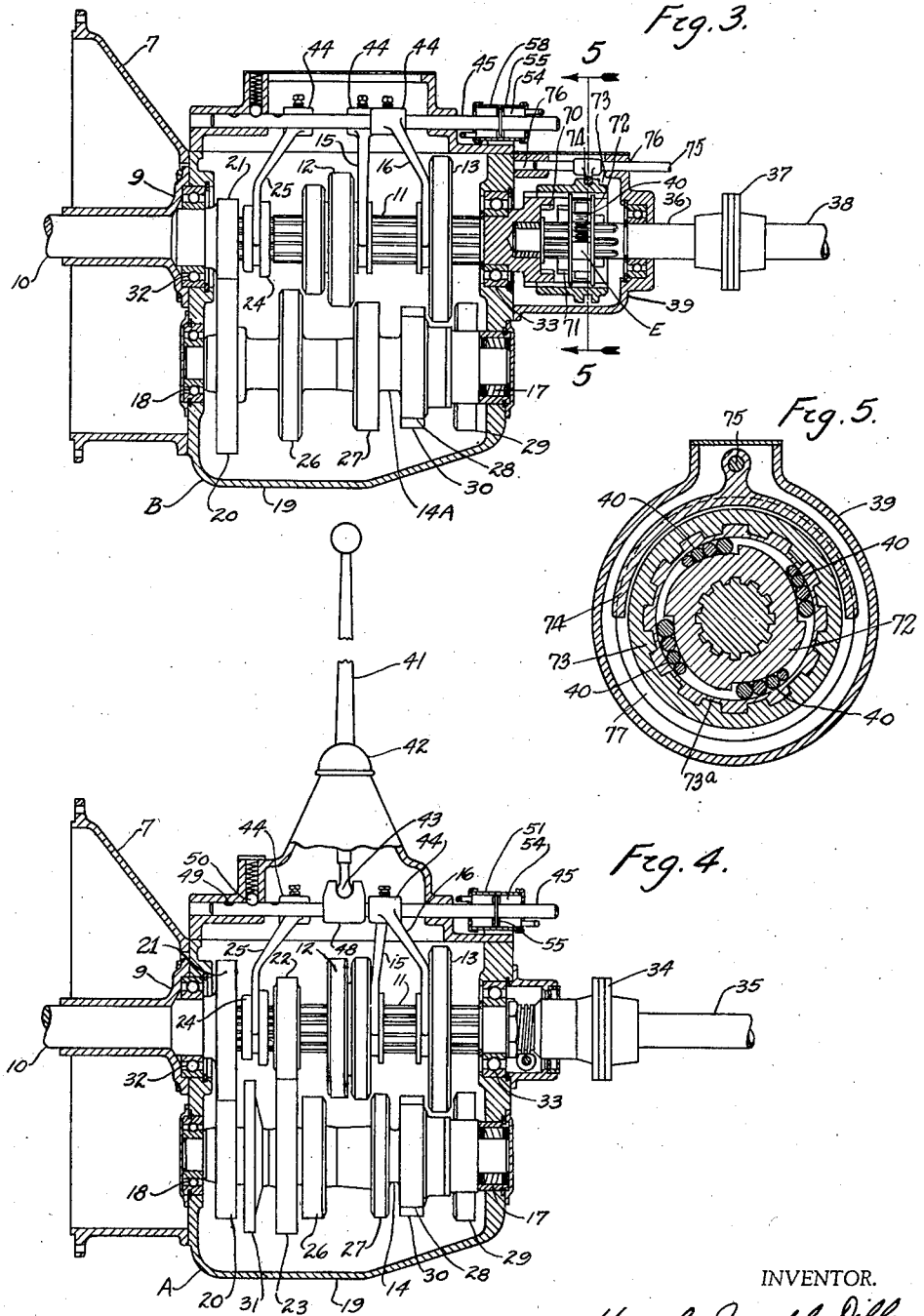

Patented Jan. 7, 1936

2,026,827

UNITED STATES PATENT OFFICE 2,026,827

TRANSMISSION MECHANISM

Hugh Joseph Dillon, Highland Park, Mich.

Application July 10, 1934, Serial No. 734,459

17 Claims. (Cl. 74—338)

My invention relates to improvements in a transmission mechanism in which a pair of transmission units are operatively controlled to transmit power from a pair of engines to drive a vehicle; and the objects of my improvement are, first, to provide a pair of transmissions, cooperatively controlled in their speed change ratios, with means to permit one or both to transmit power to drive a vehicle; second, to provide a pair of transmissions in which the manual operation of the speed change mechanism of one transmission will automatically operate the speed change mechanism of the other transmission; third, to provide a pair of transmissions cooperatively controlled and each having a different number of speed changes; fourth, to provide a pair of transmissions cooperatively controlled, one of the transmissions having a lesser number of speed changes than the other together with a free wheeling mechanism operatively connected therewith; and fifth, to provide a mechanism having a pair of transmissions, one of the transmissions being manually controlled and the manual control thereof automatically controlling the other of the transmissions.

I attain these objects by mechanism illustrated in the accompanying drawings, in which,—

Figure 1:
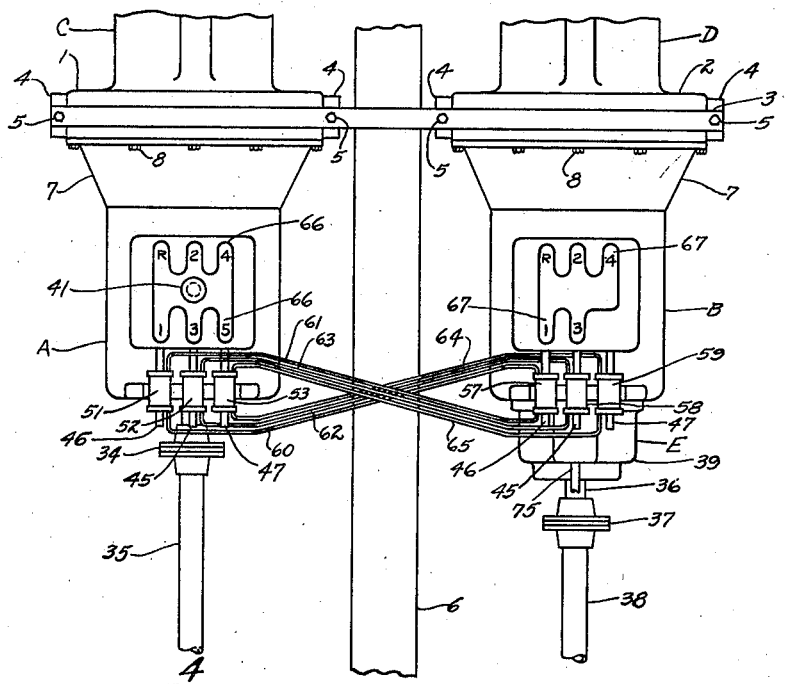
Figure 2:
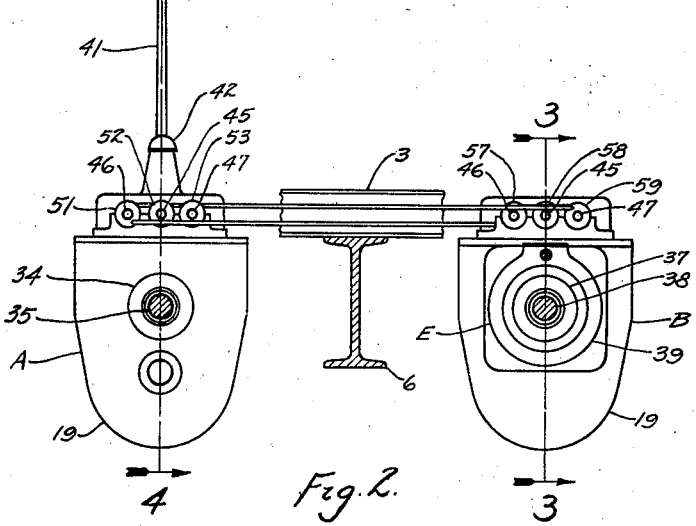

Figure 1 is a plan view of the transmission mechanism located relative to the main frame member of a vehicle; Fig. 2, an end view of the transmission mechanism disclosed in Fig. 1; Fig. 3, a sectional view through one of the transmissions, said section being taken on the line 3—3, Fig. 2; Fig. 4, a sectional view through one of the transmission units, said section being taken on the line 4—4, Fig. 2; and Fig. 5, a sectional view through the free wheeling mechanism taken on the line 5—5, Fig. 3.

The transmission assemblies A and B are respectively supported on the flywheel housings 1 and 2 of the engine assemblies C and D, the engine assemblies C and D being suitably supported on the cross member 3 by means of the extension portions 4 extending from the flywheel housings 1 and 2 and secured to the cross member 3 by the bolts 5 or by other suitable means.

The cross member 3 is suitably secured to the frame member 6 which extends longitudinally at the longitudinal center of the vehicle and thus forms the main supporting member for supporting the engine assemblies C and D together with their transmission assemblies A and B.

The transmission assemblies A and B are each provided with a clutch housing 7 which is adapted to be secured to the flywheel housings 1 and 2 by means of the bolts 8, and within the flywheel housings 1 and 2 extend the extension brackets 9 which may be used to support portions of the clutch operated mechanisms, which are not disclosed, the drive shafts 10 being suitably mounted in the extension brackets 9 and extending forward to connect with the above mentioned clutch mechanisms.

It is to be noted that the construction of the transmission assemblies A and B are of conventional type and the transmission assembly A is disclosed as being provided with five forward and one reverse speeds whereas the transmission assembly B is disclosed as being provided with only four forward and one reverse speeds.

It is thus to be especially noted that my transmission mechanism will be provided with two transmission assemblies, one of which will have one more speed gear ratio change than the other, for the purposes more clearly hereinafter set out.

The transmission assemblies A and B are each provided with a driven shaft 11 which is suitably splined to permit the sliding gears 12 and 13 to be moved longitudinally thereon to selectively engage different gears of the countershafts 14 and 14A, the sliding gears 12 and 13 being operatively connected with the shift forks 15 and 16, the shift fork 15 being straight in the transmission assembly B, the shift fork 15 being offset in the transmission assembly A.

The countershafts 14 and 14A will be rotatively mounted in the bearing assemblies 17 and 18 which are suitably mounted in the transmission cases 19. The countershafts 14 and 14A are each provided with a gear 20 which is in constant mesh engagement with the gears 21 of the drive shafts 10, thus providing means for enabling the drive shaft 10 to continually drive the countershafts 14 and 14A.

It is to be noted that the transmission assembly A will be provided with the over-drive gear 22 which is fixedly mounted against longitudinal movement on the driven shaft 11 but is rotatively mounted thereon so that it may be selectively engaged by the sliding collar 24 which may also be used to selectively engage the driving gear 21 and thus provide a direct driving connection between the drive shafts 10 and the driven shafts 11, or the sliding collar 24 may be moved to selectively engage the over-drive gear 22 and thus directly connect the driven shaft 11 with the over-drive gear 22 which will thus be driven with a greater speed than the drive shaft 10, the gear 21 of the drive shaft 10 driving the countershaft through the gear 20 and the gear 23, the gear 23 in turn driving the over-drive gear 22 together with the driven shaft 11.

The sliding collar 24 is operatively engaged by the shift lever 25.

It is to be noted that the transmission assembly B will be provided with the sliding collar 24 for connecting the drive gear 21 directly with the driven shaft 11 but is not provided with an over-drive gear such as 22 disclosed in the transmission assembly A, thus eliminating the overdrive speed in the transmission assembly B.

The countershafts 14 and 14A will be provided with the gears 26 and 27 which are adapted to be selectively engaged by the sliding gear 12 to provide different driving speeds of the driven shaft 11 in a forward direction. The sliding gear 13 of the transmission assemblies A and B is adapted to selectively engage the gears 28 which will provide another range of speed for driving the driven shaft 11 in a forward direction. At the same time the slide gear 13 is adapted to be selectively moved into engagement with the reverse gears 29 which will thus provide driving means for driving the driven shaft 11 in a reverse direction.

It is to be noted that the gears 29 together with the gears 30 will be connected together and suitably mounted in the transmission case 19 in such a manner that the gears 30 will be in constant mesh engagement with the gears 28 so that when the sliding gear 13 is moved to engage the reverse gears 29, the countershafts 14 and 14A will drive through the gears 28 to the gears 30 and the gears 29 will drive the sliding gears 13 to drive the driven shafts 11 in a reverse direction.

The gear 31 is disclosed as being mounted on the countershaft 14 in the transmission assembly A for the purposes of providing driving means for accessory units such as tire pumps, etc., the gear 31, however, being omitted in the transmission assembly B.

The drive shafts 10 will each be mounted at its rear end in the bearing assembly 32 and at its forward end in conjunction with the bearings which support the above mentioned clutch mechanism which is not disclosed. The driven shaft 11 will be suitably mounted in a pilot bearing suitably mounted in the end of the drive shaft 10, said pilot bearing for the front end of the driven shaft 11 not being disclosed. The driven shafts 11 are each supported at their rear end in the bearing assembly 33 which is suitably mounted in the transmission case 19. The driven shaft 11 in the transmission assembly A is suitably connected with the universal joint 34 which is in turn connected with the propeller shaft 35 which extends rearwardly of the vehicle and adjacent the frame member 6 to connect with the driving axles, not shown, of the vehicle inasmuch as the driving axle may be of various types and may be of the single axle type provided with separate differential gear driving mechanisms as disclosed in my patent application for Vehicle, Serial No. 689,805, filed September 18, 1933, or the drive axle mechanism of the vehicle may be of that type having separate driving axles in a six wheel vehicle as disclosed by my patent application for Vehicle, Serial No. 681,851, filed July 24, 1933.

The transmission assembly B will be provided with the free wheeling assembly E which is suitably connected with the shaft 36 which is suitably connected with the universal joint 37 which in turn is connected with the propeller shaft 38 which extends adjacent the frame member 6 and provides driving means for connecting with axle driving mechanism of the vehicle, as explained in reference to the propeller shaft 35.

The free wheeling assembly E is suitably mounted in the housing 39 which may be suitably secured to the transmission case 19 and is of conventional construction in which the rollers 40 are utilized to provide a driving connection between the driven shaft 11 and the shaft 36 when the transmission assembly B is operatively driving the vehicle in a forward direction, the rollers 40 being released from driving operation when the vehicle is coasting or in other words, when the vehicle is being propelled by its own inertia, in which case the driving axle mechanisms of the vehicle will tend to drive the vehicle through the propeller shafts 35 and 38, the rollers 40, however, upon such reversal of driving operation, being released from driving engagement and allowing the propeller shaft 38, together with the universal joint 37 and the shaft 36 to revolve without exerting any driving effort through the transmission assembly B to operate the engine assembly D.

It is to be noted that the driven shaft 11 is provided with the internal or annular gear 70 which is adapted to be engaged by the gear 71 which is connected with the collar 72 which is provided with the cam surfaces engaging the rollers 40. The collar 72 is connected with the shift collar 73 by means of the rollers 40 retained longitudinally therebetween and by the sleeve 73A rigidly connected by splines with the shift collar 73, the shift collar 73 being slidably mounted on the splines on the shaft 36 and on the outside of the annular gear 70, the shift collar 73 being slidably operable by the dog 74 mounted on the shaft 75 which is slidably mounted in the bearings 76 in the boss portions of the housing 39, the dog 74 having an arm fitting within the groove 77 of the shift collar 73. Thus the gear 71 may be shifted to engage the annular gear 70 and to form a driving connection between the shafts 11 and 36 when the shaft 11, together with its operatively connected parts, is operated to drive in a reverse driving direction or in a clockwise direction, as viewed in Fig. 5, the free wheeling operation of the assembly E thus being cut out when the transmission assembly B is being operated in a reverse gear drive direction. It is to be understood that the shaft 75 may be operatively connected by a conventional means (not disclosed) with any desired mechanism for operating the shaft 75 and its operatively connected parts by either manual or power means.

It is to be especially noted that the transmission assembly A only will be provided with a gear shift lever 41 which is of conventional construction and is adapted to be oscillated in the housing 42 to permit the ball end 43 to be moved either longitudinally or transversely relative to the axis of the driven shaft 11.

It is to be noted that each of the forks 15, 16 and 25 will be provided with the hubs 44 which are suitably secured to the shafts 45, 46 and 47.

It is also to be noted that each of the shafts 45, 46 and 47 in the transmission assemblies A will be provided with a collar 48 which is engaged by the ball end 43 of the gear shift lever 41 to enable the gear shift lever 41 to selectively engage any one of the collars 48 mounted on the shafts 45, 46 and 47 of the transmission assembly A, the shafts 45, 46 and 47 being provided with the notches 49 which are engaged by the balls 50 to properly align the shafts 45, 46 and 47 in their neutral positions to permit the ball to be moved transversely relative to the axis of the driven shaft 11 to selectively engage any one of the collars 48 and thus to be operatively connected with any one of the shafts 45, 46, and 47 in the transmission assembly A to selectively engage the desired speed changes of the transmission assembly A.

It is to be noted that each of the shafts 45, 46 and 47 of the transmission assembly A extend through the hydraulic cylinders 51, 52 and 53. The cylinders 51, 52 and 53 are provided with the cylinder spaces or bores 54 in which operates the pistons 55 which are mounted on and adapted to move with the shafts 45, 46 and 47.

The cylinder spaces 54 are closed except for conduits which are connected at each end of the cylinder spaces 54 as hereinafter disclosed.

It is to be noted that the shafts 45, 46 and 47 of the transmission assembly B also extend through similar hydraulic cylinders 57, 58 and 59 and that the hydraulic cylinder 51 of the transmission assembly A will be connected at its rear end by the conduit 60 with the front end of the hydraulic cylinder 57 of the transmission assembly B while the front end of the hydraulic cylinder 51 of the transmission assembly A will be connected by the conduit 61 to the rear end of the hydraulic cylinder 57 of the transmission assembly B.

In a similar way the rear end of the hydraulic cylinder 52 will be connected by the conduit 62 with the front end of the hydraulic cylinder 58 while the front end of the hydraulic cylinder 52 will be connected by the conduit 63 with the rear end of the hydraulic cylinder 58. Also the rear end of the hydraulic cylinder 53 of the transmission assembly A will be connected by the conduit 64 with the front end of the cylinder 59 of the transmission assembly B while the front end of the hydraulic cylinder 53 of the transmission assembly A will be connected by the conduit 65 with the rear end of the hydraulic cylinder 59 of the transmission assembly B.

It is thus to be noted that when any of the speed changes of the transmission assembly A, with the exception of the over-drive speed, are operatively selected by the operator of the vehicle by means of the gear shift lever 41 of the transmission assembly A, the same speed change will be automatically made in the transmission assembly B by means of the hydraulic connection between the hydraulic cylinders of the various gear shift shafts of the transmission assemblies A and B.

In order to facilitate the selecting of the various speeds, the transmission assembly A is provided with suitable symbols 66 thereon to designate the various speeds of the transmission assembly. In a similar way the transmission assembly B will be provided with suitable symbols 67 to denote the various speeds therein and it is to be noted that the symbols 66 disclose five forward speeds together with a reverse speed for the transmission assembly A whereas the symbols 67 disclose only four forward speeds together with a reverse speed for the transmission assembly B.

It is to be noted that whereas I have disclosed hydraulic means for automatically operating the changes of speeds in the transmission assembly B when a similar change of speeds is made in the transmission assembly A by means of the gear shift lever 41, manually operated by the operator of the vehicle, I do not limit myself to hydraulic means for such automatic operation inasmuch as pneumatic or other similar means, in which the displacement thereof will actuate the pistons 55 and their connected shafts, may be used for automatically connecting the gear shift mechanisms of the two transmissions, the hydraulically operated mechanism being used to more clearly and easily disclose the automatic operation of my transmission mechanism.

It is to be thus seen that I have provided a transmission mechanism whereby the movement of a manually operated gear shift lever, in one of the transmission units thereof, will simultaneously operate in an identical manner the gear shift mechanism of the second transmission assembly B, this construction thus permitting the elimination of a gear shift lever in the second transmission assembly.

Also it is to be especially noted that I have provided a transmission mechanism in which the transmission assembly B, together with its operatively connected mechanism, may be automatically cut out from driving the vehicle when a predetermined road speed has been attained, this economically leaving only one engine assembly C together with the transmission assembly A for operating the vehicle after the vehicle has been accelerated and a certain predetermined speed has been attained and yet permits both of the engine assemblies C and D together with both transmission assemblies A and B to be operated simultaneously and automatically as soon as the speed of the vehicle has dropped down to a predetermined speed of the vehicle.

It is to be noted that the engine assemblies C and D will be operatively controlled by suitable governor and speed control mechanisms as disclosed in my application for Vehicle, Serial No. 681,851, filed July 24, 1933, for the purposes of so controlling the engine assemblies C and D to permit the operation of my transmission mechanism as above described.

I claim:

1. In a transmission mechanism for a vehicle having a pair of engines and driving mechanism, the combination of a transmission suitably mounted and operatively connected with one of the engines and the driving mechanism of the vehicle, said transmission having a plurality of under drive gear reduction speeds together with an overdrive gear speed, said transmission further having a gear shift mechanism for manually selecting the desired gear ratio of the transmission, a second transmission suitably mounted and operatively connected with the other of the engines and the driving mechanism of the vehicle, said second transmission having gear shift mechanism together with a number of under drive gear reduction speeds equal in number to the under drive gear reduction speeds of said first mentioned transmission, a free wheeling mechanism suitably mounted and operatively interposed between said second transmission and the driving mechanism of the vehicle, and means operatively connecting the gear shift mechanism of said first mentioned transmission with the gear shift mechanism of said second transmission to permit automatic operation of the gear shift mechanism of said second transmission when the gear shift mechanism of said first mentioned gear mechanism is manually operated, to shift the under drive gear reduction speeds thereof, the over drive gear of said first mentioned transmission being shiftable by the manual gear shift mechanism of said first mentioned transmission without effecting any shifting of gear ratios in said second transmission to enable the vehicle to be driven by one only of said pair of engines and with the over drive gear speed of said first mentioned transmission when said free wheeling mechanism is providing free wheeling operation.

2. In a transmission mechanism, the combination of a pair of transmissions suitably mounted and each provided with speed change mechanisms comprising gear trains, one of said gear trains of one only of said speed change mechanisms having an over drive ratio, one of the gears of each of the gear trains of said speed change mechanisms being shiftably mounted relative to the remaining gears of its train, a lever member movably mounted and adapted to be operatively connected with the shiftable gear of each of said gear trains only of the speed change mechanism having the gear train with an overdrive ratio, means operatively connecting said lever member with the shiftable gear of each of said gear trains of said speed change mechanism having the gear train with an overdrive ratio, and gear shifting mechanism operatively connecting like shiftable gears in each of the speed change mechanisms of each of said pair of transmissions to enable the operation of the shiftable gear of the speed change mechanism of the transmission provided with said lever member to operate the like shiftable gear of the speed change mechanism of the other of said pair of transmissions, said gear shifting mechanism comprising shifting rods located in each of said transmissions and operatively connected with the speed change mechanisms thereof, said gear shifting mechanism further comprising pistons movably mounted in cylinders for displacing fluid in cylinders, a portion of said pistons being operatively connected with the shifting rods operatively connected with the shiftable gears of the speed change mechanism of one transmission and displacing the fluid to operate the pistons operatively connected with the shifting rods operatively connected with the speed change mechanism of the other of said pair of transmissions.

3. In a transmission mechanism, the combination of a pair of transmissions each provided with speed change gear trains having shiftable gears, and a pair of speed change control mechanisms operatively connected with said shiftable gears of said speed change gear trains, said pair of speed change control mechanisms being operatively connected with one another and comprising fluid displacing members operatively connected with said shiftable gears, the shift movement of a shiftable gear in one transmission operating a fluid displacing member and shiftable gear of the other transmission.

4. In a transmission mechanism for a vehicle, the combination of a pair of transmissions each provided with speed change gear trains having shiftable gears, one of said transmissions having a lesser number of speed change gear trains than the other of said transmissions, shifting rods in each of said pair of transmissions and operatively connected with the speed change gear trains thereof, and speed ratio changing mechanism operatively connecting the shifting rods in one transmission with an equal number of shifting rods in the other of said transmissions, said speed changing mechanism comprising displaceable members operatively connected with the shifting rods in one transmission and with displaceable members operatively connected with the shifting rods of the other of said transmissions to automatically control the speed ratio changing operation in said other of said transmissions, said transmission having the greater number of gear trains being provided with a gear train adapted to drive the vehicle without a driving effort being applied through the gear trains of the transmission having the lesser number of gear trains.

5. In a transmission mechanism for a vehicle, the combination of a pair of transmissions each provided with reduction gear trains and a main driven shaft, one only of said transmissions being provided with an overdrive gear train, a free wheeling mechanism operatively connected with the main driven shaft of one of said transmissions and the vehicle, shifting rods in each of said pair of transmissions and operatively connected with the reduction gear trains thereof, and speed ratio changing mechanism operatively connecting the shifting rods operatively connected with the reduction gear trains of one transmission with the reduction gear trains of the other of said transmissions to simultaneously effect speed ratio changes in the reduction gear trains of said transmissions, said speed changing mechanism comprising displaceable members operatively connected with the shifting rods operatively connected with the reduction gear trains of one transmission and with displaceable members operatively connected with the shifting rods operatively connected with the reduction gear trains of the other of said transmissions, said speed ratio changing mechanism further comprising a lever member operatively connected solely with the shifting rods and the reduction gear trains together with the over drive gear train of one of said pair of transmissions.

6. In a transmission mechanism for a vehicle having a pair of engines, the combination of a pair of transmissions each provided with reduction gear trains and a main driven shaft, one only of said transmissions being provided with an overdrive gear train, each of said transmissions being operatively connected with one only of said engines, shifting rod mechanism operatively connected with the reduction and over drive gear trains of said first mentioned transmission, a second shifting rod mechanism operatively connected with the reduction gear trains of the second of said pair of transmissions, a gear shift lever swivelly mounted and operatively connected with said shifting rod mechanism operatively connected with the reduction and overdrive gear trains of said first mentioned transmission and for changing the speed ratios thereof, a gear shift mechanism provided with displaceable members and operatively connected with said first mentioned shifting rod mechanism operatively connected with the reduction and overdrive gear trains of the first mentioned transmission and with displaceable members operatively connected with said second shifting rod mechanism operatively connected with the reduction gear trains of the second transmission to effect the same change speed ratios in the reduction gear trains of said second transmission as are effected in the reduction gear trains of said first mentioned transmissions, propeller means operatively connecting the main shaft of said first mentioned transmission with the vehicle, a second propeller means for connecting said second transmission with the vehicle, and free wheeling means operatively connecting the main shaft of said second transmission with the propeller means for connecting said second transmission with the vehicle, said free wheeling means enabling said second propeller means to overrun said main shaft of said second transmission when said first mentioned propeller means is being driven at the overdrive speed.

7. In a transmission mechanism for a vehicle provided with a pair of engines and propeller means for connecting the transmission mechanism with the vehicle, the combination of a pair of transmissions each operatively connected with one only of said engines and with the driving mechanism of the vehicle, each of said transmissions being provided with equal members of reduction gear trains, one only of said transmissions being further provided with an overdrive gear train, shifting rod mechanism operatively connected with the reduction and over drive gear trains of said first mentioned transmission, a second shifting rod mechanism operatively connected with the reduction gear trains of the second of said pair of transmissions, a manually movable lever mechanism operatively connected with said first mentioned shifting rod mechanism operatively connected with the reduction and overdrive gear trains only of said transmission having said overdrive gear train for effecting change speed ratios therein, fluid displacing mechanism mounted on each of said transmissions and operatively connected with said first and said second shifting mechanisms of each of said transmissions and with each other to effect the same change speed ratios in said second transmission as are effected in said transmission having said overdrive gear train, and a free wheeling mechanism operatively connected with said second transmission and one of said propeller-means to permit the vehicle to be driven solely through said transmission having said overdrive gear train.

8. In a transmission mechanism for a vehicle having a pair of engines and driving mechanism, the combination of a pair of transmissions each operatively connected with one only of said engines and the driving mechanism of the vehicle, each of said transmissions being provided with an equal number of underdrive speed change gear trains, one only of said transmissions being further provided with an overdrive speed change gear train, a manually controlled lever mounted on one only of said transmissions having the overdrive speed change gear train and operatively connected with and for controlling the speed changes of the underdrive and overdrive speed change gear trains of said transmission, and gear shift mechanism for controlling the speed changes of the second transmission, said gear shift mechanism being operatively connected between said manually controlled lever and the underdrive speed change gear trains of said first mentioned transmission and the underdrive speed change gear trains of said second transmission to render the speed changes in said second transmission controllable only through said manually controlled lever mounted on said first mentioned transmission and to further permit one of the engines to drive the vehicle solely through the overdrive speed change gear trains of said first mentioned transmission.

9. In a transmission mechanism for a vehicle having a pair of engines, the combination of a pair of transmissions each operatively connected with one of said pair of engines, and each provided with gear trains together with sliding shafts operatively connected with said gear trains, cylinders surrounding each of said sliding shafts, pistons connected with said sliding shafts and operating in said cylinders, a gear shift lever operatively connected with said sliding shafts of one only of said transmissions, conduit members connecting each of the cylinders of one of said transmissions with a cylinder of the other of said transmissions, and a displaceable medium contained with said cylinders and said conduits.

10. In a vehicle, the combination with a pair of engines and a pair of variable geared transmissions operated by said engines, of a manually operable lever mechanism for changing the gearing of one only of said transmissions, means connecting said manually operable lever with the gearing of said one only of said transmissions, and fluid displacing means controlled by said manually operable lever for changing the gearing of the second transmission, said fluid displacing means being operatively connected between said manually operable lever and the gearing of said second transmission.

11. In a vehicle, the combination with a pair of engines and a pair of variable geared transmissions operated by said engines, of a manually operable lever mechanism for changing the gearing of one only of said transmissions, means connecting said manually operable lever with the gearing of said one only of said transmission, fluid displacing means controlled by said manually operable lever for changing the gearing of the second transmission, said fluid displacing means being operatively connected between said manually operable lever and the gearing of said second transmission, said fluid displacing means comprising cylinders mounted on each of said transmissions together with piston members movably mounted in said cylinders and operatively connected with change gears in said transmissions.

12. In a transmission mechanism for a vehicle having a pair of engines, the combination of a pair of transmissions each operatively connected with one of said pair of engines and each provided with an equal number of underdrive gear trains, one only of said transmissions being further provided with an overdrive gear train, slidably mounted shafts operatively connected with said gear trains, cylinders surrounding each of said slidably mounted shafts operatively connected with said underdrive gear trains, pistons connected with said slidably mounted shafts and operating in said cylinders, a gear shift lever operatively connected with the slidably mounted shafts only of said transmission having both overdrive and underdrive gear trains, conduit members connecting each of the cylinders of one of said transmissions with the cylinders of the other of said transmissions, and a displaceable medium contained within said cylinders and said conduits.

13. In a transmission for a vehicle having a pair of engines, the combination of a pair of transmissions each operatively connected with one of said engines and each provided with gear trains together with movably mounted shafts operatively connected with said gear trains, cylinders surrounding each of said movably mounted shafts, pistons connected with said movably mounted shafts and operating in said cylinders, a gear shift lever operatively connected with and adapted to operate said movably mounted shafts of one only of said transmissions, conduit members connecting each of the cylinders of one of said transmissions with a cylinder of the other of said transmissions, displaceable means in said cylinders and said conduits, and a free wheeling mechanism operatively connected with one only of said transmissions to permit one of said engines to drive the vehicle through the other only of said transmissions.

14. In a transmission for a vehicle having a pair of engines, the combination of a pair of transmission assemblies each operatively connected with one of said engines and each provided with gear trains together with reciprocating means operatively connected with said gear trains, cylinders engaged by portions of said reciprocating means to displace a fluid, a gear shift lever operatively connected with and adapted to operate said reciprocating means, conduit members connecting each of the cylinders of one of said transmissions with the cylinders of the other of said transmissions, and fluid in said cylinders and said conduits.

15. In a transmission for a vehicle having a pair of engines, the combination of a pair of transmission assemblies each operatively connected with one of said engines and each provided with gear trains together with reciprocating means operatively connected with said gear trains, the gear trains of one of the transmissions comprising an overdrive ratio, the remaining gear trains of both of said gear transmissions comprising underdrive ratios, cylinders engaged by portions of said reciprocating means to displace a fluid, a gear shift lever operatively connected with and adapted to operate said reciprocating means, conduit members connecting each of the cylinders of one of said transmissions with the cylinders of the other of said transmissions, and fluid in said cylinders and said conduits.

16. In a transmission for a vehicle having a pair of engines, the combination of a pair of transmission assemblies each operatively connected with one of said engines and each provided with a driven main shaft together with gear trains operatively connected with said main shafts, said transmission assemblies being further provided with the reciprocating means operatively connected with said gear trains, cylinders engaging portions of said reciprocating means to displace a fluid, a gear shift lever operatively connected with and adapted to operate said reciprocating means, conduit members connecting each of the cylinders of each of said transmissions with the cylinders of the other of said transmissions, fluid in said cylinders and said conduits, and a free wheeling mechanism operatively connected with the driven main shaft of one only of said pair of transmissions.

17. In a transmission for a vehicle having a pair of engines, the combination of a pair of transmission assemblies each operatively connected with one of said engines and each provided with a driven main shaft together with gear trains operatively connected with said driven main shafts, said transmission assemblies being further provided with reciprocating means operatively connected with said gear trains, cylinders engaging portions of said reciprocating means to displace a fluid, a gear shift lever operatively connected with and adapted to operate said reciprocating means, conduit members connecting each of the cylinders of each of said transmissions with the cylinders of the other of said transmissions, fluid in said cylinders and said conduits, a free wheeling mechanism operatively connected with the main shaft of one only of said pair of transmission, and gear shift mechanism for positively connecting the free wheeling mechanism with the main shaft of said transmission provided with said free wheeling mechanism.

HUGH JOSEPH DILLON.